United States Patent [19]
Regar

[11] 4,110,982
[45] Sep. 5, 1978

[54] AUXILIARY DRIVE ASSEMBLY FOR ACCELERATING A VEHICLE

[75] Inventor: Karl-Nikolaus Regar, Munich, Fed. Rep. of Germany

[73] Assignee: Maschinenfabrik Augsburg-Nurnberg Aktiengesellschaft, Munich, Fed. Rep. of Germany

[21] Appl. No.: 825,797

[22] Filed: Aug. 18, 1977

[30] Foreign Application Priority Data

Aug. 19, 1976 [DE] Fed. Rep. of Germany ....... 2637322

[51] Int. Cl.² .............................................. F15B 1/02
[52] U.S. Cl. ....................................... 60/413; 60/414; 74/572
[58] Field of Search ..................... 60/413, 414; 74/572

[56] References Cited

U.S. PATENT DOCUMENTS

| 3,485,037 | 12/1969 | Clerk | 74/572 X |
| 3,665,788 | 5/1972 | Nyman | 60/413 X |
| 3,675,112 | 7/1972 | Smith | 60/413 X |
| 4,037,409 | 7/1977 | Leibach | 60/413 |

Primary Examiner—Edgar W. Geoghegan
Attorney, Agent, or Firm—Alan H. Levine

[57] ABSTRACT

An auxiliary drive assembly for use with a vehicle having a drive shaft and a driven shaft. The auxiliary drive assembly includes a flywheel as a source of energy. First and second hydraulic pump/motor units are hydraulically coupled to each other. Summation gearing is provided having a first input connected to the flywheel and to the first motor/pump unit, a second input connected to the second motor/pump unit, and an output from which power can be released. The summation gearing output can be connected to the drive shaft, by means of a releasable coupling, for driving the drive shaft or charging the flywheel. The second motor/pump unit has a brake so that the flywheel can be charged very rapidly by the drive shaft. The drive shaft and driven shaft can be separated to further increase the speed of charging the flywheel.

3 Claims, 4 Drawing Figures

AUXILIARY DRIVE ASSEMBLY FOR ACCELERATING A VEHICLE

The invention relates to an auxiliary drive assembly, particularly for accelerating combat vehicles, having a flywheel as a source of energy, two adjustable hydraulic motor/pump units which can be hydraulically coupled to each other, and a summation gear unit. The summation gear unit is provided with a first input for the flywheel and the first motor/pump unit, a second input for the second motor/pump unit, and an output for the energy released, which output can be coupled to a main drive shaft for driving a main driven gear or for charging the flywheel.

Disregarding secondary parameters such as ground angle composition of the soil and the like, the acceleration which the vehicle can achieve depends upon the ratio of the engine power obtainable to the mass of the vehicle. If, therefore, an increase in acceleration is desired, it is necessary to increase the effective power that can be used for driving the vehicle. This is not necessarily done by increasing the engine capacity, since particularly in the case of very heavy vehicles such as for example trucks and the like, the vehicle mass is very high, so that only a considerable increase in engine power results in a noticeable improvement in acceleration values. Thus, for instance, tests have been performed with energy stores which store a portion of the kinetic energy of the vehicle when it is being braked and add it to the engine power when needed. Such an energy store is formed, for instance, with a flywheel which is brought up to speed by brake power, and which, when necessary, for the purpose of acceleration, can release the kinetic energy stored therein to the main driven gear of the vehicle.

A basic problem of such an arrangement is the fact that the flywheel is to be accelerated when the vehicle and its main drive shaft and main driven gear are being decelerated, and that these units are accelerated when the energy release leads to a reduction in the speed of the flywheel. This problem has been solved by providing a summation or differential gear having a first input for the flywheel and a first motor/pump unit, which under certain circumstances may be rigidly coupled to the flywheel. The summation or differential gear also has a second input, for a second motor/pump unit, and an output through which power is released and an input through which power is received. The two hydraulic motor/pump units provided operate alternatively as a motor or a pump in such a manner that the input with the surplus power or rotational speed is connected to a pump which transmits energy to the other input which does not have speed or power, and where the motor/pump unit provided operates as a motor. The advantage of this arrangement resides in the fact that a considerable portion of the kinetic energy is transferred from the flywheel directly to the main driven gear or vice versa, and that only a relatively small portion of the converted total energy, via the hydraulic pump and the hydraulic motor, is to be used for speed compensation, but at a necessarily very high loss.

The auxiliary drive assembly described above is arranged to take advantage of the brake power. If, however, the flywheel store is initially 'empty', i.e., the flywheel has only a low rotational speed or no speed at all, it is possible, by shifting the two motor/pump units to their neutral position, to adjust the auxiliary drive assembly in such a manner that simultaneously the auxiliary drive assembly runs empty without drawing any significant amount of energy from the main drive shaft and thus without interfering with the driving operation.

Accordingly, it is an object of the invention to refine the auxiliary drive assembly described hereinbefore, in such a manner that at any time the flywheel can be brought up to its nominal speed as rapidly as possible, so that the auxiliary drive assembly can then be fully utilized.

This object is attained according to the invention by providing on the second motor/pump unit a brake which permits rapid charging of the flywheel by the main drive shaft.

Through this amazingly simple expedient, one branch of the summation gear is blocked along with the motor/pump unit, so that as a result there is provided between the main driver and the flywheel a geared transmission with a fixed transmission ratio. In this case it is then only necessary to shift the first motor/pump unit, which is connected with the flywheel, to the neutral position, whereupon, in an accelerating mode, the main driver, in conjunction with the main driven gear, also brings the flywheel up to speed. It is then essential that for the purpose of charging the flywheel store there exists only one geared connection between the main drive shaft and the flywheel, while at the same time the entire hydraulic system of the auxiliary drive assembly is inactive. Thus, the flywheel store is charged with an output efficiency of about 90%.

The auxiliary drive assembly of the invention can be charged in an advantageous manner during a gradual accelerating process of the vehicle when the full accelerating capacity is not required. In this case the main drive assembly of the vehicle delivers its full power, accelerating at the same time the flywheel store and the vehicle, and switches to the normal driving operation when the flywheel store has reached its maximum capacity.

A particularly advantageous field of application of the auxiliary drive assembly is in the area of combat vehicles which under certain operating conditions would have to cross "in a jump" open terrain that may be under attack by enemy fire. Since as a rule such vehicles must accelerate extremely high masses (armor plating, gun power, and fighting material), while in the case of track-laying vehicles it should be taken into account that the mass of the caterpillar tracks undergoes, in relation to the vehicle proper, a doubled acceleration, it is evident that precisely in this range of application an auxiliary drive assembly is required which, even if for a short time, must have an extremely high power density in relation to the weight, as in the case of the auxiliary drive assembly of the invention.

According to one form of the invention the main drive shaft can also be separated from the main driven gear so as to rapidly charge the flywheel. As a result, a vehicle can recharge the empty flywheel store when standing still, and subsequently take advantage of its full additional power when accelerating. Thus a combat vehicle, while making use of natural obstacles, can cover short stretches at an extremely high accelerated speed, and recharge the flywheel store during the times when it is under cover. As a result of the invention, this charging takes place very rapidly, since the flywheel is very efficiently connected with the main drive shaft by means of a positive coupling.

In principle it is possible for the auxiliary drive assembly of the invention to continually run simultaneously, since by releasing the brake and putting the two motor/pump units in the neutral position it can run empty simultaneously at any time without consuming or releasing power. Even if in this case the flywheel should be damaged or should become jammed, it would only increase the rotational speed of the second motor/pump unit without having any significant effect on the whole main drive assembly. For safety reasons, still another advantageous refinement of the invention consists in there being additionally provided a releasable coupling between the main drive assembly and the auxiliary drive assembly. In case, therefore, due to the effect of enemy action directed at the combat vehicle, the entire auxiliary drive assembly is damaged to such an extent that both the flywheel and the second motor/pump unit are jammed, the vehicle can nevertheless be operated without further disturbance, as the entire damaged auxiliary drive assembly is uncoupled. In such a case it will, of course, be necessary to give up the accelerative power of the auxiliary drive assembly.

As is known, in the case of a combat vehicle any complication must be avoided, since under certain circumstances it could disable the entire vehicle operation. The invention makes it possible, however, to eliminate the complication which results from the installation of the auxiliary drive assembly in that when the coupling is released, a condition is created as if the auxiliary drive assembly were not present.

The invention is further explained hereinafter with reference to the accompanying drawings illustrating an example of a preferred embodiment.

Figure 1:
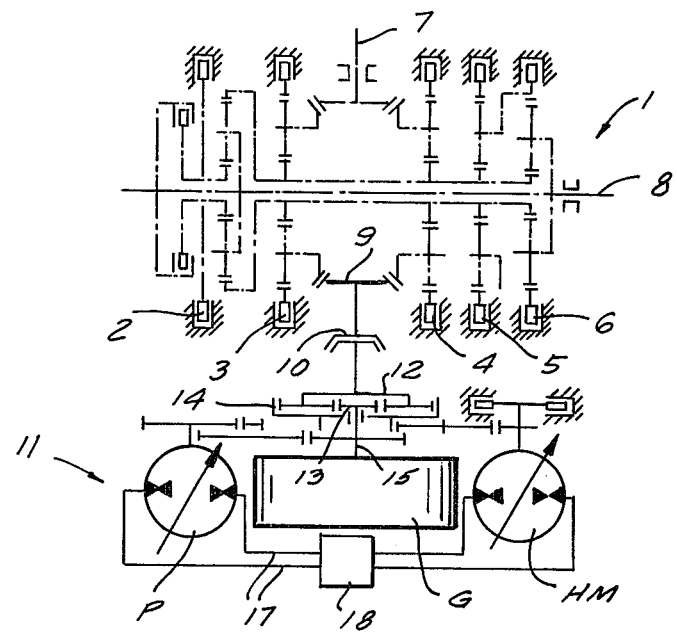
FIG. 1 is a schematic diagram of an auxiliary drive assembly of the invention coupled to the main drive assembly of a track-laying vehicle.

FIG. 1 shows a change-speed gear unit 1 consisting of individual, interconnected sets of planetary gear wheels whose individual sections can be slowed down by means of the brakes 2 to 6 so as to provide different gear ratios. Via a drive shaft 7, which is joined to a hydrodynamic converter and subsequently to a driving motor, the gear unit receives power which is taken from a shaft 8. In the same manner as the drive shaft 7, the output of the auxiliary drive assembly is connected with the gear shaft 8. A shaft leads from the output 9 to a controllable coupling 10, through which the entire auxiliary drive assembly 11 can be disconnected from the gear unit 1.

The auxiliary drive assembly 11 proper consists of a flywheel G which is associated with two hydraulic units P and HM. The two hydraulic units are each adjustable and can be set selectively in the 'pump' position in which they accept power, in the neutral position in which they are simultaneously running 'uncharged', or in the 'motor' position in which they release power. Such hydraulic units are, for example, adjustable wobble pumps.

The shaft running from the coupling 10 is joined to the planet carrier 12 of a planetary gearing whose sun wheel 13 is directly connected with the flywheel G via a shaft 15. The outer rim 14 of the planetary gearing is connected, by way of a transmission gear, with the hydraulic unit HM, so that its rotational speed determines, at a preset rotational speed of the output 9, the rate of rotation of the flywheel G. On the shaft of the hydraulic unit HM there is also provided, in conjunction with the geared connection with the outer rim 14, a lockable brake 16 (FIG. 2) by means of which the outer rim 14 can be secured in position via the geared connection, so that energy introduced from the output 9 into the auxiliary drive assembly 11 is transmitted, undivided, to the flywheel shaft 15 by way of the planet carrier 12 and the sun wheel 13.

In addition to the flywheel G, there is also provided on the flywheel shaft 15 a transmission gear associated with the hydraulic unit P, so that the latter steadily rotates simultaneously with the flywheel G in the same direction of rotation and in a fixed rotational relationship. If necessary, it is of course possible to additionally provide a releasable coupling in the power train from the shaft 15 to the hydraulic unit P if in a particular case the uncoupling of the hydraulic unit P is preferred to its running empty in the neutral position. In certain cases, there may also be provided, instead of or in addition to the series coupling 10, a hydrodynamic converter for smooth compensation of speed differences. The two hydraulic units P and HM are interconnected via lines 17 which meet in a valve unit 18.

Figure 2:
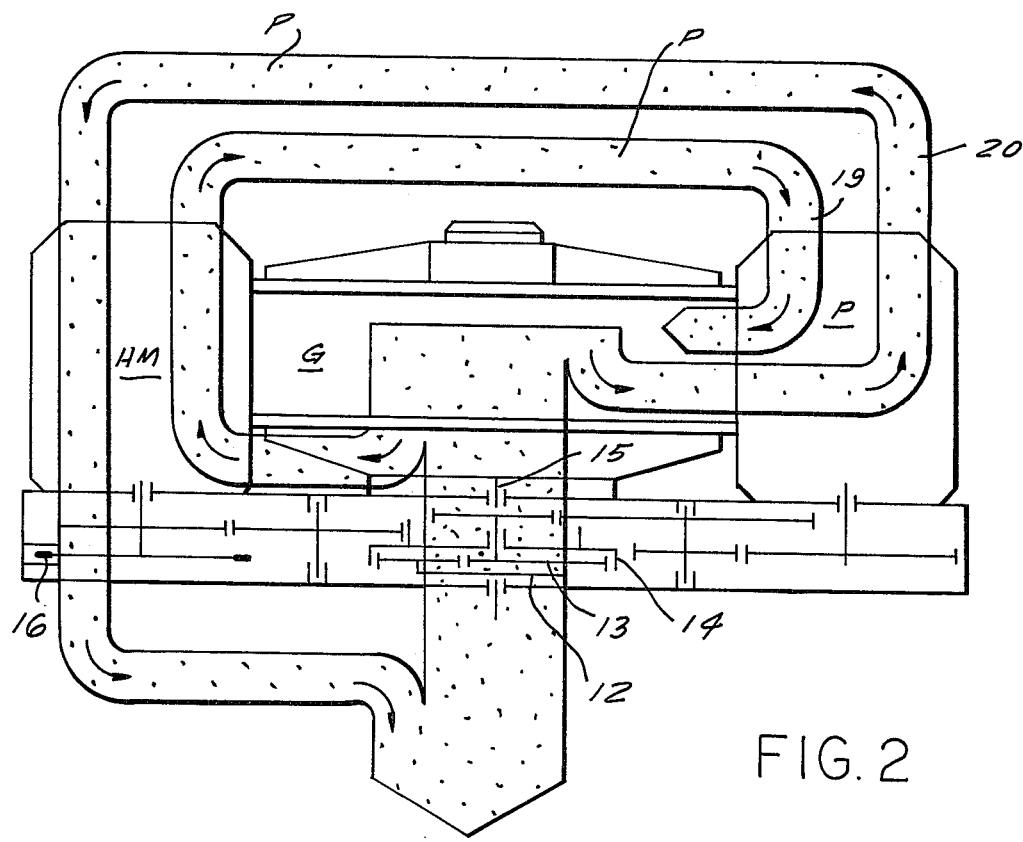
FIG. 2 is a diagrammatic representation of the energy flow in the auxiliary drive assembly during the accelerating process.

FIG. 2 shows a diagram of the energy flow in the auxiliary drive assembly of the invention during the accelerating process. The bringing up to speed of a vehicle from a stationary position will be explained with reference to this diagram.

Let is be assumed that, when the vehicle is standing still, the flywheel G is rotating at its maximum speed (e.g., 10,000 rpm). The adjustable hydraulic unit P is rotating in the same direction and is set at zero delivery. The coupling 10 is closed, and the driven shaft 8 of the gear unit 1, the main driver 7, the output 9 of the auxiliary drive assembly 11, and thus also the planet carrier 12 are at rest. The hydraulic unit HM is in the neutral position and is rotating, when the brake is open, in the direction opposite to the direction of rotation of the flywheel G at a speed which results from the planetary gear receiving the speed of the flywheel G.

Assume it is now desired for the vehicle to start off at an increased acceleration, to which end the combustion engine and the accelerating system are utilized jointly. The third speed of the vehicle operation is "introduced", i.e., of the brakes 2 to 6, those needed are operated and the combustion engine is connected with the shaft 7 by way of a hydrodynamic converter (not shown). At the same time, the hydraulic unit HM is switched to 'pump' operation, and the hydraulic unit P to 'motor' operation. Since the hydraulic unit HM functions as a pump, there arises at the output of the planetary gear a supporting moment by which the outer rim 14 is braked, as a result of which there arises at the output 9 of the auxiliary drive assembly a driving moment. The energy needed to produce the supporting moment is taken from the flywheel, but is immediately returned via the hydraulic unit operating as a motor. This energy flow is shown in branch 19 in the diagram of FIG. 2.

Figure 4:
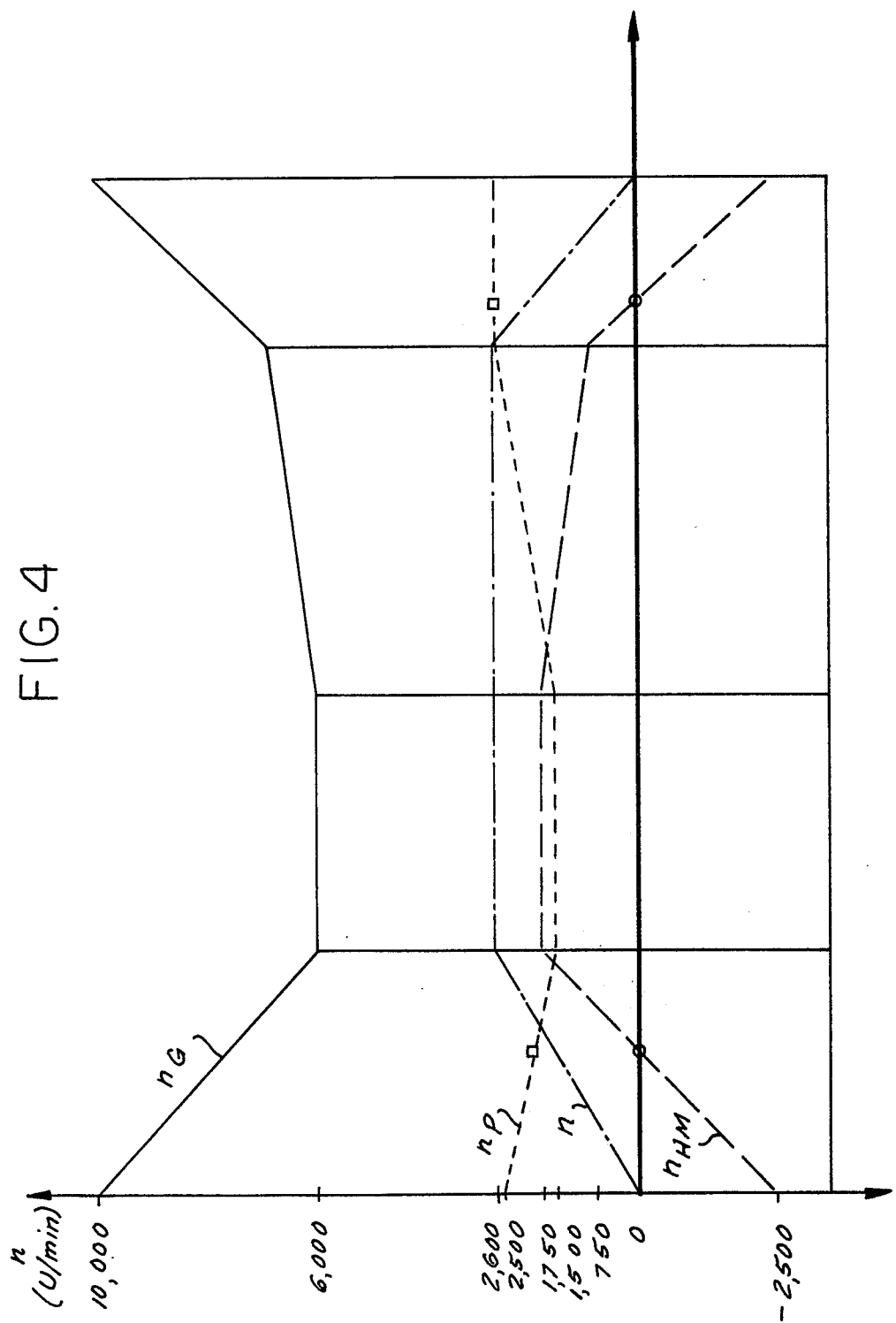
FIG. 4 is a diagram in which the changes in the rotational speeds of the components of the auxiliary drive assembly of the invention takes place during an assumed driving pattern are graphically illustrated.

FIG. 4 shows the respective speed curves. It is evident that the rotational speed of the flywheel $n_G$ is continually proportional to the rotational speed of the hydraulic unit $n_p$. It is further evident that during the starting process the number of revolutions $n$ of the output 9 of the auxiliary drive assembly rises from zero to the nominal speed of the drive shaft 7. Accordingly, the speed $n$ is, in accordance with the gear transmission chosen, essentially proportional to the driving speed of the driven vehicle.

The rotational speed of the hydraulic unit HM ($n_{HM}$) starts negatively; thus, the hydraulic unit runs in a direction which is opposite to that of the flywheel. By applying the supporting moment, the speed of the flywheel G decreases, and it delivers energy to the vehicle drive assembly by way of the summation gear. As the speed $n$ of the driven shaft increases and the speed $n_G$ of the flywheel decreases, the speed of the hydraulic unit HM is also continually reduced, since these three rotational speeds are related to each other in accordance with the following equation:

$$n = (n_G + i \cdot n_{HM})/(i + 1).$$

where $i$ is the fixed gear ratio of the set of planet wheels.

As a result, the rotational speed of the hydraulic unit HM decreases until that unit stands still. At this point it reverses its direction of rotation. At the same time, the hydraulic unit P is switched from 'motor' operation, in which position it was functioning thus far, to 'pump' operation by actuating valves, and drives the hydraulic unit HM which is switched to 'motor' operation. From this moment on a flow of energy is initiated which is indicated in branch 20 shown in FIG. 2; the unit P now takes energy from the flywheel and transmits it to the drive shaft via the unit HM and the intermediate gearing.

As is apparent from FIG. 2, the greatest portion of the energy taken from the flywheel is transmitted to the vehicle drive assembly by mechanical means, which takes place with a very high transmission efficiency of about 90%. Only a smaller portion of the energy flows through the hydrostatic motor/pump units and is transmitted to the vehicle drive assembly with an efficiency of about 65%.

When the vehicle has reached a speed of about 46 km/h, the speed of the flywheel G has dropped down to 6,000 rpm, and the combustion engine runs for example at its maximum speed of 2,600 rpm. If the vehicle should continue to accelerate, it is necessary to shift to the next gear and the accelerating system is switched off, since the hydraulic units HM and P are switched to the neutral position and thus set at zero delivery. They then run empty simultaneously with the flywheel. The auxiliary drive assembly in combination with the combustion engine makes it possible for the track-laying vehicle equipped therewith, when starting off from a stationary position, to cover, with low additional weight, within 10 seconds about 106 meters in terrain or 118 meters on the road, taking a vehicle weight of 50 $t$ as a basis; accordingly, there is an acceleration value of about 3 m/s².

According to the driving diagram shown in FIG. 4, a constant speed follows the acceleration without charging, in which case the rotational speed $n$ is proportional to the driving speed. The components of the auxiliary drive assembly are running empty simultaneously, i.e., they substantially retain their rotational speed. FIG. 4 shows further how at a constant driving speed and consequently at a constant rotational speed $n$ the engine power of the main drive assembly 7 increases, the power supplied via the coupling 10 to the auxiliary drive assembly 11 being transmitted to the flywheel G partly directly, and partly indirectly via the hydraulic units HM and P, in which case they compensate for the respective speed difference between the flywheel G and the main drive assembly 7 and consequently the coupling 10.

Figure 3:
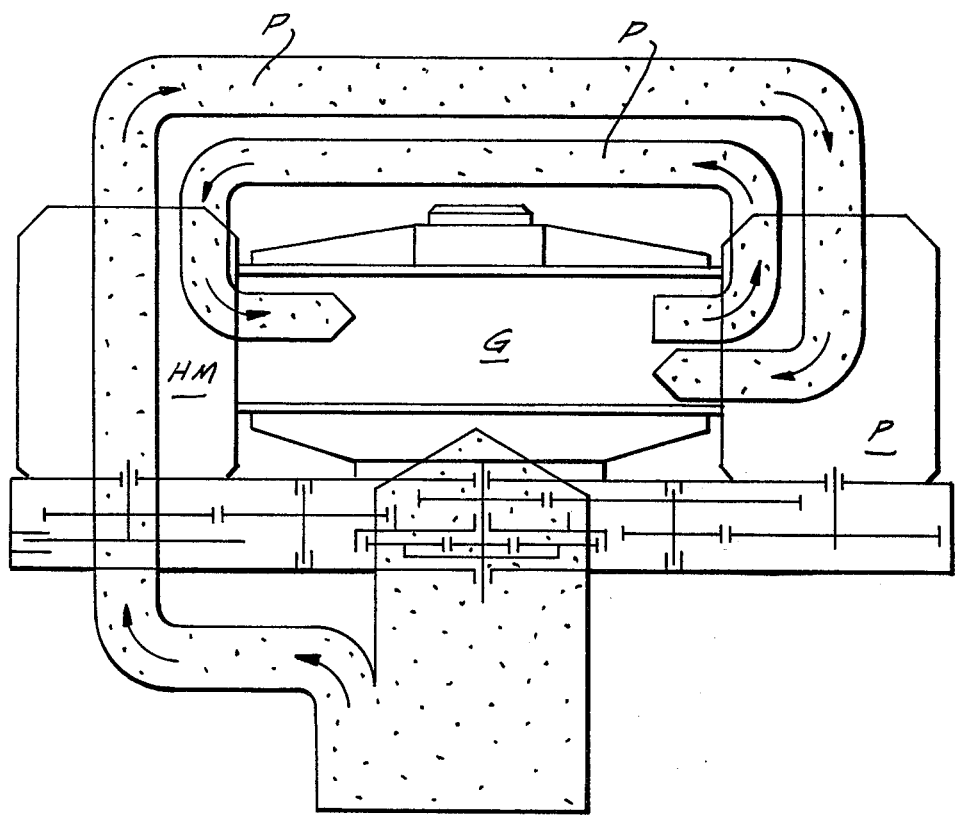
FIG. 3 is a diagrammatic representation of the energy flow in the auxiliary drive assembly of the invention during braking.

The brake system available is used to brake the vehicle, but it is possible, under certain operating conditions, to store a portion of the kinetic energy of the vehicle in the flywheel, to charge it and relieve at the same time the brake system. In order to store the braking energy in the flywheel, the hydraulic unit HM is set at 'pump' operation and the hydraulic unit P at 'motor' operation. At the same time the combustion engine is uncoupled. The mode of operation of the auxiliary drive assembly when storing the energy is the reverse of the mode of operation in the accelerating process; the corresponding flows of energy are shown in the diagram of FIG. 3 and the last part of the diagram of FIG. 4. If necessary, when the vehicle is standing still, it is also possible to charge the flywheel store in a very short time, which is particularly important. In this case the brakes 5 and 6 remain applied at the shaft 8, while the brakes 3 and 4 remain disengaged. Thus, only a section of the gear unit 1 is simultaneously rotating empty when the main drive shaft is rotating, without power being supplied to the driven shaft 8. As a result, all the engine power is transmitted to the auxiliary drive assembly via the input 9 of the auxiliary drive assembly and the coupling 10. The brake 16 therein is tightened, so that the hydraulic unit HM is completely at rest and locks, via the associated gear, the outer rim 14 of the planetary gearing, so that it acts as a rigid transmission between the coupling 10 and the flywheel G. The speed of the flywheel G increases in proportion to the rotational speed of the main drive shaft 7 connected to the driving engine, so that, when the driving engine has gradually reached its nominal speed of 2,600 rpm, the flywheel G has also reached at the same time its nominal speed of 10,000 rpm. During this time the hydraulic unit P remains in the neutral position, while after reaching the nominal speed the hydraulic unit HM is also brought to its neutral position and the brake 16 is released. The auxiliary drive assembly is now ready for a new accelerating process.

The accelerating system can be put into operation when standing still or also during driving, so that by switching on the auxiliary drive assembly, also during a driving condition, the acceleration of the driving engine is assisted until it reaches its nominal speed.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An auxiliary drive assembly for accelerating a vehicle having a drive shaft and a driven shaft, said auxiliary drive assembly comprising:
   (a) a flywheel,
   (b) first and second adjustable hydraulic motor/pump units and means for hydraulically coupling said units to each other, (c) summation gearing having a first input connected to said flywheel and to said first motor/pump unit, a second input connected to said second motor/pump unit, and an output from which power can be released, (d) means for connecting said summation gearing output to the drive shaft for driving the latter or charging said flywheel, and (e) a brake in said second motor/pump unit for effecting rapid charging of said flywheel by the drive shaft.

2. An auxiliary drive assembly as defined in claim 1 including means for separating the drive shaft from the driven shaft to obtain more rapid charging of said flywheel.

3. An auxiliary drive assembly as defined in claim 1 including a releasable coupling between the drive shaft and the auxiliary drive assembly.

* * * * *